United States Patent [19]
Graham

[11] Patent Number: 4,765,468
[45] Date of Patent: Aug. 23, 1988

[54] DOSIMETER SECURITY PACKAGING

[76] Inventor: Barry D. Graham, 841 Vale View Dr., Vista, Calif. 92083

[21] Appl. No.: 727,906

[22] Filed: Apr. 26, 1985

[51] Int. Cl.$^4$ .............................................. B65D 85/38
[52] U.S. Cl. ..................... 206/305; 206/569; 206/1.5; 70/229; 73/431; 116/200; 250/336.1
[58] Field of Search ............... 206/1.5, 305, 569, 806, 206/807; 73/431; 250/336.1, 374; 248/218.4, 231; 239/50, 57, 60; 422/305, 306; D23/150; 220/210; 292/259, 264; 70/229, 330; 116/200, 206

[56] References Cited

U.S. PATENT DOCUMENTS

| | | | |
|---|---|---|---|
| D. 262,821 | 1/1982 | Poore | D23/150 |
| 623,380 | 4/1889 | Neiman, Jr. | 292/264 |
| 862,594 | 8/1907 | Stoops | 292/259 |
| 894,973 | 8/1980 | Moryan | 206/806 |
| 1,989,300 | 1/1935 | Webb | 220/210 |
| 2,738,224 | 3/1956 | Turner et al. | 239/57 |
| 2,791,058 | 5/1957 | Bettini | 239/57 |
| 2,801,879 | 8/1957 | Dick | 239/57 |
| 3,274,809 | 9/1967 | Kozlowski | 292/264 |
| 3,837,574 | 9/1974 | Curran | 239/57 |
| 3,930,389 | 1/1976 | Buikus | 220/210 |
| 3,945,568 | 3/1976 | Bychowski | 239/57 |
| 3,985,017 | 10/1976 | Goldsmith | 73/23 |
| 4,092,119 | 5/1978 | Baier et al. | 116/206 |
| 4,094,639 | 6/1978 | McMillan | 239/60 |
| 4,136,282 | 1/1979 | Cox et al. | 250/336.1 |
| 4,144,032 | 3/1979 | Davis, Jr. | 73/863.21 |
| 4,219,145 | 8/1980 | Jaeschke et al. | 239/60 |
| 4,249,403 | 2/1981 | Littlejohn | 70/230 |
| 4,254,888 | 3/1981 | Chandler | 220/210 |
| 4,491,729 | 1/1985 | Stahl et al. | 250/336.1 |
| 4,605,858 | 8/1986 | Terhune | 250/336.1 |

FOREIGN PATENT DOCUMENTS 562428  2/1923  France .............................. 239/57

*Primary Examiner*—David T. Fidei
*Attorney, Agent, or Firm*—Lyon & Lyon

[57] ABSTRACT

A field security package for a dosimeter includes two interlocking rigid elements made of a reflective polyvinyl chloride material in which a dosimeter is positioned. The elements collectively providing a spiral wound grid surface to provide adequate ventilation, simultaneously a cover to prevent ingress of moisture, a reflective surface for heat and a radiation pervious material. The two elements of the security package can be interlocked together with the link of a chain for secure mounting from support means.

15 Claims, 1 Drawing Sheet

U.S. Patent
Aug. 23, 1988
4,765,468
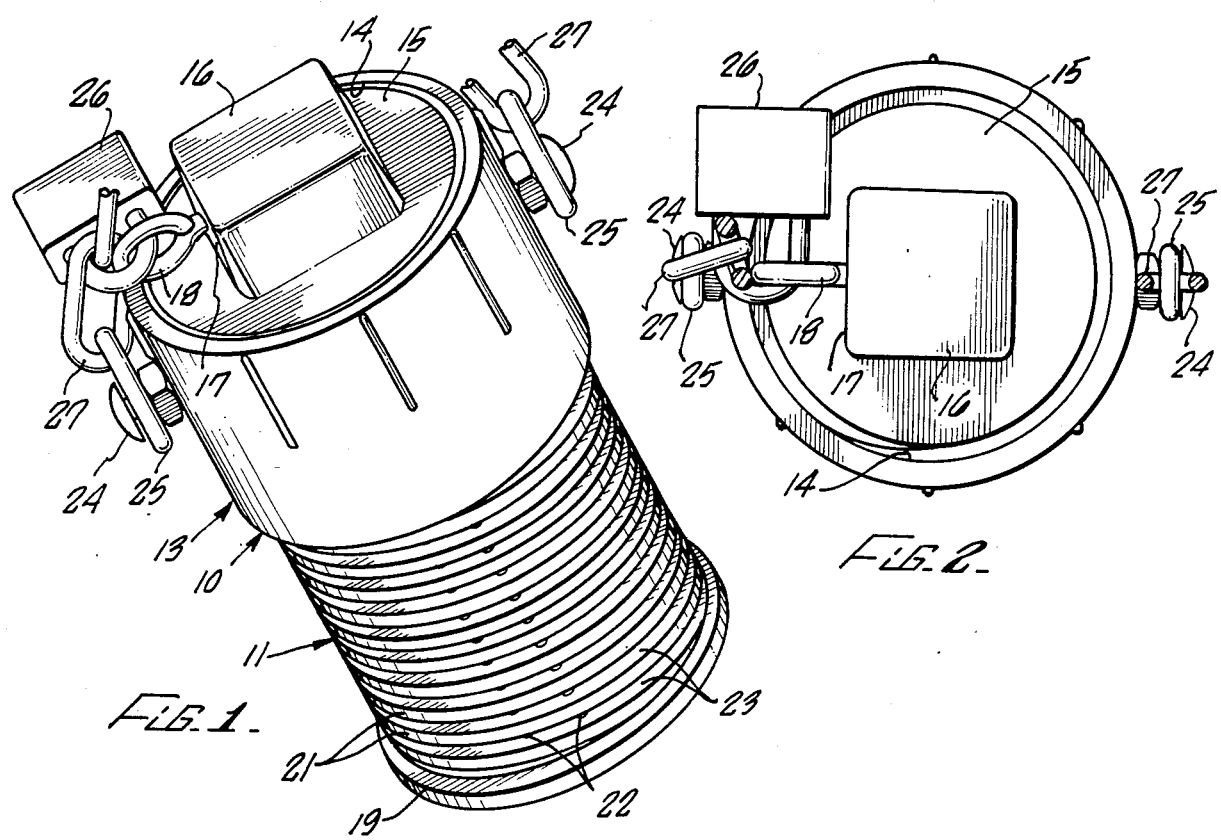
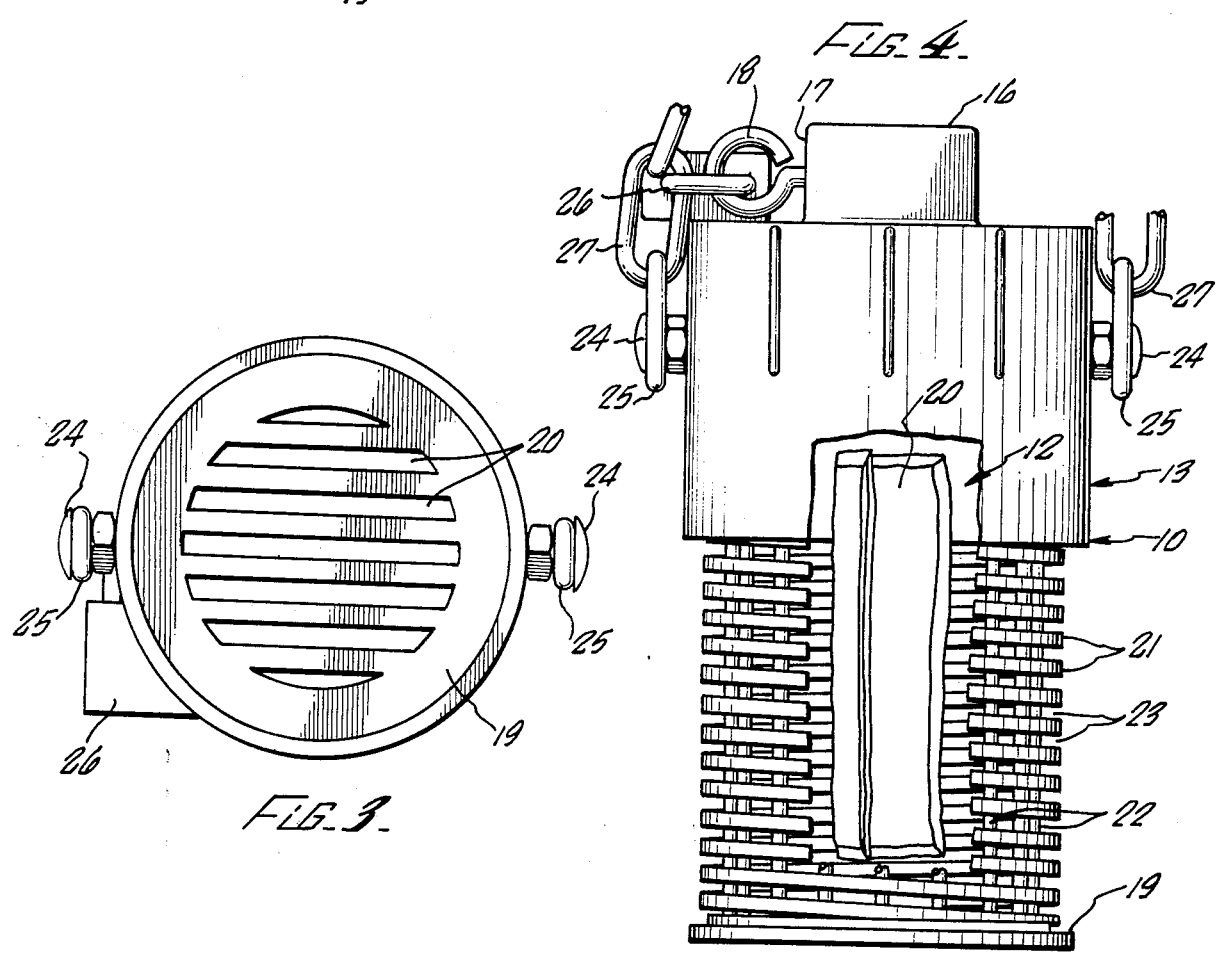

DOSIMETER SECURITY PACKAGING

BACKGROUND OF THE INVENTION

This invention relates to security packaging for radiation detection dosimeters. In particular it relates to an effective means for securing a dosimeter in location to detect environmental radiation, while at the same time the packaging is not an obstacle to inaccurate radiation readings.

Dosimeters are used by government and industry companies at licensed nuclear facilities. The regulations controls associated with such power generation requires accurate measurement of environmental radiation exposures. For this purpose dosimeters are placed for extended periods at geographically strategic points about the facility and periodically are removed by the responsible party to determine radiation exposures. By their nature of being located in the environment dosimeters are an attraction for vandals. While the actual cost of each lost or damaged dosimeter is in itself relatively inexpensive, the coast of lost data from a stolen or damaged dosimeter is substantial. This particularly so since regulatory authorities require accurate accounting of dosimeters by LNF, and explanations from utilities for lost dosimeters and lost information. Repetitive failures in this connection compounds administration expenses. It is thus estimated that while each dosimeter itself may cost relatively little, the expenses consequent the lost dosimeter may be hundreds of times greater.

Many forms of dosimeter and packaging therefor are known, but in the applicant's knowledge none of them provide for an effective security packaging of the dosimeters, while at the same time allowing for unobstructed measurements of environmental radiation exposures.

SUMMARY OF THE INVENTION

A security package for dosimeter includes at least two rigid interlockable elements, one of which provides an at least partly grid surface having a space to structure ratio in the range of 50% to 65%. The first element at its upper portion together with the second element, which is a cap, fits inside the bore of the cylindrical first element and is substantially solid thereby providing an effective cover for the ingress of moisture.

The elements are made from a polyvinyl chloride synthetic resinous material so as to be impervious to the effects of weather and the surface is reflective of heat.

A chain affixed to the first element provides a linkage which matingly relates with an eye bolt from the second cap element such that a padlock can simultaneously interlock the first element, second element, and chain, preferably with the support means. In this manner, the structure is a deterrent to random vandalism.

BRIEF DESCRIPTION OF THE DRAWINGS

FIG. 1 is a perspective from the top of a security package in accordance with the invention.

FIG. 2 is a top plan view of the security package.

FIG. 3 is a bottom plan view of the security package, and

FIG. 4 is a side elevation view with part cut away of the security package.

DETAILED DESCRIPTION

A security package for a dosimeter comprises a first element 10 constituted by a structure which is rigid and which has an at least partly grid wall 11 to permit effective ventilation to the interior of the package and to allow for the upper portion 13 of the first rigid element 10 is substantially solid. The structure is substantially of a cylindrical tubular shape, and the uppermost portion of the upper portion 13 provides internal threads 14 for engagement with a second element 15.

The second element, or cap 15 provides an integrally formed bolt head 16 which protrudes above the cap 15. From a wall 17 of the bolt head there extends an eye bolt 18 which is threadingly located in the wall 17. The first element 10 and second rigid element 15 are interengageable in interlocking fashion.

The first element 10 includes a base 19 which provides spaced apertures 20 for egress of any fluid which may collect in the interior 12 of the bottom element 10.

Both the first element and the second element are made of a PVC material and surface is of a white reflective nature thereby to reflect heat from the security package. The upper portion 13 together with the cap element 15 provide an effective cover to moisture ingress to the dosimeter 20 which is located substantially adjacent the wall 11 of the first element 10, the dosimeter package itself being frictionally held in location relative to the wall.

The wall 11 of the first element 10 is provided by a spiral wound formation with right angularly disposed support elements from the base 19. The relative space to structure ratio, which space is defined collectively by the spaces 23 and the structure by the right angular supports 22 and spiral wound elements 21 is in the range of 50% to 65% to provide effective ventilation to maintain the temperature for a dosimeter adequate. Preferably, the range is between 50% and 60% and most preferably between 57% to 59%. To allow for maximum open area and maximum strength the apertures 20 in the base portion 19 has approximately a 50% space to structure ratio.

Located by means of bolts 24 at diametrically opposed positions on the upper portion 13 of the first element 10 is a link chain 25. The chain permits for location of the security package on a suitable support means, a padlock 26 located in one link 27 of the chain 25 is adapted also to secure the eye bolt 18 on the second element 15 and if appropriate, the chain 25 to the support means for the security package. In this fashion the eye bolt linkage 18 matingly locates with the link 27 and the padlock locking member 26 so that the first element and second element and supporting chain can be effectively interlocked together.

The security packaging for the dosimeter of the present invention provides different features which are of themselves competing and provides a package unit meeting the effective requirements for locating dosimeters in the field for extended periods of time such that vandalism is deterred and yet radiation measurements by the dosimeter located within the package are effectively achieved. In the result the security package is ventilated to achieve temperature stability for the dosimeter, has a spiral wound base structure to provide maximum exposure and yet adequate structure for the package, is color selected to be reflective of heat, is of a material where there is no absorption of radiation such as photons, is security locatable by means of interlocking first and second elements together with a locating chain, is substantially resistant to water ingress by virtue of the solid cap type and other structure to the packaging and is of a gauge of material which is adequate to provide strength to the package.

The packaging for the dosimeter provides for an important advance in the field of dosimeter application in industry.

Although a preferred form of the invention has been described it is apparent that variations and modifications can be made without departing from the spirit of the scope of the invention. For instance, instead of a spiral wound structure to constitute the lower element of the air portion of the first element, it would be possible to have a conventional right angularly formed grid structure.

All matter contained in the above description and as shown in the accompanying drawings should be interpreted as illustrating but not limiting, the invention being interpreted solely by the scope of the appended claims.

I claim:

1. Dosimeter security packaging comprising at least a first rigid element defining an open-ended interior capable of receiving a radiation measuring dosimeter, the first rigid element having at least partly a substantially grid wall to permit effective ventilation to the interior of the first rigid element, and a second rigid element interengageable with the first element for interlocking relationship with the first element at the open end of the interior of the first element such that a dosimeter received in the interior of the first element is substantially completely surrounded by the first and second elements, the first and second elements collectively providing effective cover to moisture ingress to the dosimeter, means affixed to at least one of the elements for permitting support of the first and second elements in the environment, the first and second elements being constituted by a material pervious to radiation whereby the dosimeter can be simultaneously effectively exposed to radiation and securely mounted with a support.

2. Dosimeter security packaging as claimed in claim 1, the first element comprising a grid base, an upper and a lower portion defining the interior, the upper and lower portions being hollow and substantially cylindrical in shape, the upper portion being substantially solid and having means for threading engagement with the second element, and the lower portion being the substantially grid wall, the grid base being attached to and closing an end of the lower portion opposite to the upper portion, and the second element comprising a cap for threading engagement with the upper portion of the first element.

3. Dosimeter security packaging as claimed in claim 2, wherein the grid wall of the first element is constituted by spiral wound elements together with a right angularly disposed support members directed from the grid base.

4. Dosimeter security packaging as claimed in claim 3, wherein the upper portion includes anchorage elements for a chain for permitting suspension from support means.

5. Dosimeter security packaging as claimed in claim 4, wherein the second element includes a linkage adapted to matingly locate with a link of the chain such that a locking member simultaneously interlocks together the first element, the second element, and the chain.

6. Dosimeter security packaging as claimed in claim 5, wherein the material of which the elements are made is a polyvinyl chloride synthetic resinous material.

7. Dosimeter security packaging as claimed in claim 6, wherein the locking member is a padlock.

8. Dosimeter security packaging as claimed in claim 7, wherein the linkage is an eyebolt secured to the second element.

9. Dosimeter security packaging as claimed in claim 8 wherein the second element includes an integrally formed bolt head, and the eyebolt is secured to the bolt head.

10. Dosimeter security packaging as claimed in claim 4, wherein the chain is secured to the first member at two positions relatively diametrically opposite each other.

11. Dosimeter security packaging as claimed in any one of the above claims wherein the grid spacing is in the range whereby the space to structure ratio is between 50% to 65%.

12. Dosimeter security packaging as claimed in claim 11, wherein the ratio is between 55% and 60%.

13. Dosimeter security packaging as claimed in claim 11, wherein the material of the first and second elements provides a surface reflective of heat.

14. Dosimeter security packaging as claimed in claim 12, wherein the material of the first and second elements provides a surface reflective of heat.

15. Dosimeter security packaging comprising a first rigid polyvinyl chloride heat reflective substantially cylindrical first element defining an open-ended interior capable of receiving a radiation measuring dosimeter, the first element having at least partly a substantially grid wall having a space to structure ratio of 50% to 65% to permit effective ventilation to the interior of the first element, and a second rigid polyvinyl chloride heat reflective cap element interengageable with the first element for interlocking relationship with the first element at the open end of the interior of the first element such that a dosimeter received in the interior of the first element is substantially completely surrounded by the first and second elements, the first and second elements collectively providing effective cover to moisture ingress to the dosimeter, means affixed to at least one of the elements for permitting support of the first and second elements substantially freely in the environment, whereby the dosimeter can simultaneously accurately measure radiation and be securely mounted with a support.

* * * * *